Jan. 4, 1949.　　　A. C. SCINTA　　　2,458,211
VALVE
Filed May 25, 1944
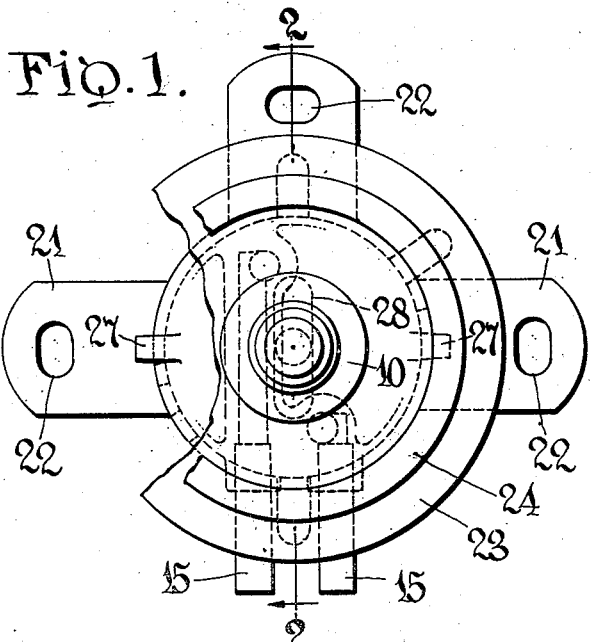
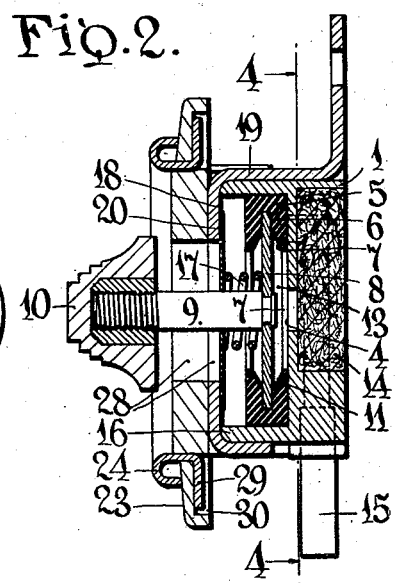
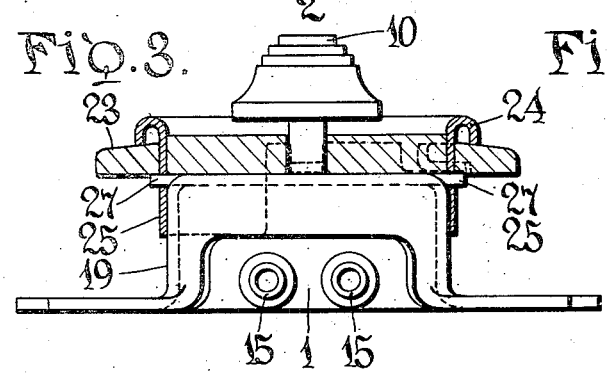
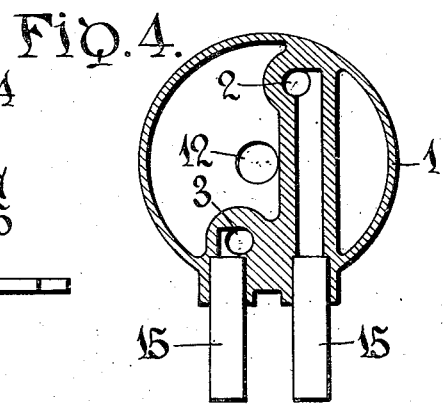
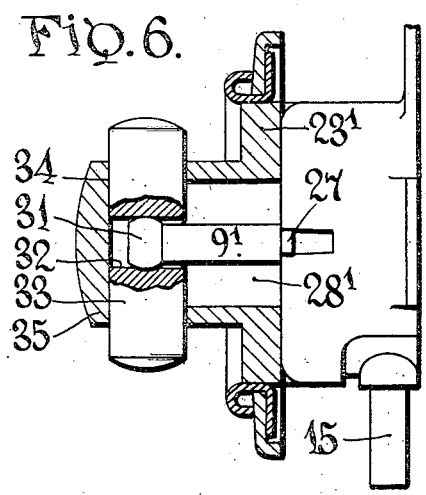
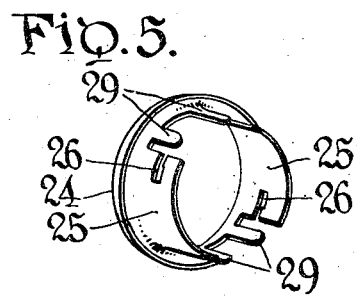
INVENTOR
ANTHONY C. SCINTA
BY
Bean, Brooks, Buckley & Bean
ATTORNEYS Patented Jan. 4, 1949

2,458,211

UNITED STATES PATENT OFFICE 2,458,211

VALVE

Anthony C. Scinta, Buffalo, N. Y., assignor to
Trico Products Corporation, Buffalo, N. Y.

Application May 25, 1944, Serial No. 537,271

15 Claims. (Cl. 251—125)

This invention relates to a valve and one especially adapted for controlling the operation of fluid operated motors, such as window operators or other light motors operable from a source of suction.

The object of the present invention is to provide a control valve of simple and economical design which is efficient in operation and of practical utility.

The invention further has for its object to provide a control valve for suction operated accessories for motor vehicles and the like which is of simple design and novel in its operation in that the valving member is rockable on one or the other of two axes adjacent spaced ports for opening the remote port while maintaining the near port effectively sealed against fluid leakage.

In the drawing,

Fig. 1 is a plan view of the valve with portions broken away;

Fig. 2 is a vertical sectional view therethrough about on line 2—2 of Fig. 1;

Fig. 3 is a side elevation of the valve with the face plate in section;

Fig. 4 is a sectional view about on line 4—4 of Fig. 2;

Fig. 5 is a detailed perspective view of the locking ring used for securing the face plate in position; and Fig. 6 is a sectional view partly in elevation depicting a modified embodiment of valve actuator.

Referring more particularly to the drawing, the numeral 1 designates the body of the valve having spaced ports 2 and 3 opening through a seat forming face 4 thereof. Engaging the seat is a valve 5 in the form of a soft rubber annulus with opposite portions of the ring seating over the two ports. The inner periphery of this valving ring is provided with a groove 6 which imparts thereto a cross section of U-design and defines a lower flexible flange 7 free of the plate and of a width sufficient to close both ports. The ports are arranged substantially at diametrical points, with respect to the valving ring, and therefore one side or arc of the ring may be lifted from its port while the opposite side remains in port closing position, and vice versa. To accomplish this rocking or tilting action a stiff member in the form of a disk 8 has its margin or periphery engaged in the groove 6, a relatively fixed operating stem 9 extending axially from the disk and carrying on its outer end a knob 10. By simply pressing the knob to one side or the other, the disk 8 will rock and thereby serve to lift the rubber valving ring 5 at one side or the other to open the corresponding port, the opposite portion of the flange 7 remaining in port sealing engagement with the seat due to the resiliency of the soft rubber body of the ring. To increase this resiliency or flexibility of the valving flange the latter may taper inwardly, as at 11, to reduce the thickness thereof. The flange 7 is by this arrangement anchored to the margin of the plate and extends inwardly over the latter but free thereof to provide in effect a hinge mounting from which the plate rocks while permitting the flange, acting in the capacity of a flap valve, to remain fully seated over its port. The seat face 4 is provided with a port 12 for admitting fluid at atmospheric or other pressure into the valve chamber 13 beneath the tiltable or rockable valve. Atmospheric air may be filtered by a pad 14, as shown in Fig. 2, and when the valve is tilted to open either port 2 or 3 the air flow will then be out from the chamber 13 through the opened one of these ports. The ports may be connected by the nipples 15 to a suction operated motor to unbalance the same when either port is opened, the source of suction for such motor acting normally through the latter to hold the valving ring seated.

The body 1 is provided with a retaining rim 16 upstanding about the margin of the seat 4 so as to retain the valving ring 5 in position on the seat. A coil spring 17 bears upon the upper face of the disk 8 to urge the valving member to its operative position, wherein both of the suction or motor ports 2 and 3 are closed. This spring may find bearing on the bottom wall 18 of an inverted cup shaped casing 19 telescoped over the rim 16, or a special washer 20 may be placed upon the bottom 18 for supporting the spring 17 under compression. The washer may snugly fit the stem 9 and slide on the wall 18 when the stem is rocked. Radial fingers 21 extending from the margin of the cup 19 are provided with screw receiving openings 22 for mounting the casing on a support.

A face or escutcheon plate 23 is superimposed upon the wall 18 to give a neat appearance to the installation, such face plate being retained in position by a ring 24 which has a pair of arcuate attaching members 25 extending through like shaped slots in the plate for centering the latter on the casing by telescoping the same. These members are provided with bayonet slots 26, Fig. 5, to receive the lugs 27 struck out from the casing 19. By turning the ring counterclockwise or clockwise the face plate may readily be secured in place or demounted as the occasion may require. The face plate and the wall 18 are formed with registering slots 28 through which the actuating stem 9 projects, the elongation of the aperture defining the direction of tilt for the valve to uncover one or the other of the suction or motor ports 2 or 3. The slot in the wall 18 will be closed by the washer 20 to exclude dust and dirt from entering the casing. The retaining ring 24 may be firmly united to the facing plate by bending the lugs 29 outwardly over the back face of the plate which is formed with recesses 30 to receive the lugs.

By simply rocking the knob 10 up or down the valving ring 5 will be caused to tilt on the seat and lift one side from the selected port to open it to the atmospheric port 12, the low side of the ring maintaining its port sealing engagement with the seat by reason of the flexibility of the flange 7. The construction is of simple and practical design enabling the valve to be produced economically. The provision of the flexible sealing flange on the underside of the rocking disk enables one portion of the flange to remain operative when the opposite portion is lifted from the seat.

In Fig. 6 the actuating stem 9' has been given a semi-balled formation at its outer end, as indicated at 31, such balled terminal being received in a cylindrical transverse bore 32 provided in a slidably mounted push button or pin 33. The push button is slidable in a transverse bearing 34 formed in a central enlargement 35 on the face plate 23' in which the guide slot 28' is also formed. By simply pushing the pin 33 up or down the stem 9' will be rocked to operate the valve accordingly.

While the foregoing description has been given in detail it is not the intention thereby to limit the invention since the inventive principles involved are capable of assuming other physical embodiments without departing from the spirit of the invention as defined by the appended claims.

What is claimed is:

1. A valve comprising a body having a seat formed with spaced ports and a valving member engaged with the seat in a manner normally to close both ports, said valving member being rockable on the seat about spaced fulcrumed points each adjacent a respective port whereby to lift the valving member from the remote port to open the latter, each port closing portion of the valving member operating to maintain its associated port closed when the remote port is opened, and means selectively operable to so rock the valving member for opening the selected one of the ports.

2. A valve comprising a body having a seat with spaced ports, a rigid valving member rockable back and forth on opposite marginal portions as points of fulcrum to open one or the other of said ports, but normally having both marginal portions engaging the seat for simultaneously closing both ports, each port closing portion of the valving member operating to maintain its port closed when the companion port is opened, and means selectively operable to so rock the valving member for opening the selected one of said ports.

3. A valve comprising a body having a seat with spaced ports, a valving member having spaced portions normally closing the ports and rockable on each portion to lift the companion portion to a port opening position, each port closing portion of the valving member operating to maintain its port closed when the companion port is opened, means selectively operable to so rock the valving member to open the selected one of said ports, and means resiliently holding the valving member in its normal position.

4. A valve comprising a body having a seat with spaced ports, a valving member including a flexible part having spaced port sealing portions normally closing the ports and rockable on each portion to lift the companion portion to a port opening position, the other portion remaining in its port closing position while permitting such rocking movement.

5. A valve comprising a body having a flat face with spaced ports, and a valve rockably mounted on the seat and including a rockable member having oppositely extending margins carrying flexible port sealing portions serving normally to close the two ports, each flexible portion acting to retain its port closed when the companion portion is lifted from the seat upon the rocking of the member upon one margin or the other.

6. A valve comprising a body having a flat seat with spaced ports, an actuator plate rockable on one or the other of two opposite marginal portions adjacent the two ports for lifting the other marginal portion away from the seat, and a ring of soft rubber-like material having a groove about its inner periphery receiving the margin of the plate and defining a flange which overlaps the plate, said flange being free from the plate and flexible to seat over and close the ports and so remain operative at one side when the plate is rocked to lift the flange to uncover the remote port.

7. A valve comprising a body having a flat seat with spaced ports, an actuator plate rockable on one or the other of the two opposite marginal portions adjacent the two ports for lifting the other marginal portion away from the seat, a ring of soft rubber-like material carried by the plate and providing a flexible port sealing flange extending inwardly over the plate but free of the same whereby said flange may remain fully seated when the plate is rocked to open the remote port, and a shaft upstanding from the plate for rocking the same with its port sealing ring.

8. A valve comprising a body having a flat seat with spaced ports and an upstanding encircling rim, a disk-like valve member rockable on the seat within the rim by tilting the valve member on one or the other of its opposite marginal portions adjacent the two ports for lifting the remote marginal portion away from the seat to open a selected port, and an actuating stem upstanding from the valve member for rocking the same.

9. A valve comprising a body having a flat seat with spaced ports, an actuator plate rockable on one or the other of the two opposite marginal portions adjacent the two ports for lifting the other marginal portion away from the seat, a ring of soft rubber-like material encircling the margin of the plate and serving therewith as a valve member to close the ports but adapted to be lifted upon the rocking of the plate to selectively open the ports, said body having an upstanding rim encircling and guiding the rocking movement of the valve member, and resilient means for urging the valve member to its normal position.

10. A valve comprising a body having a flat seat with spaced ports, a flat valving member having spaced marginal portions engaging the seat to close the ports, said member being rockable on the seat to lift either marginal portion to open the selected port, a stem upstanding from the valving member for rocking the same, said body having a marginal rim about the seat for retaining the valving member in position on its seat, resilient means for urging the plate to its normal position closing both ports, and means for guiding the stem to determine the rocking action of the valving member.

11. A valve comprising a body having a flat seat with spaced ports, a flat valving member having spaced marginal portions engaging the seat to close the ports, said member being rockable on the seat to lift either marginal portion to open the selected port, a stem upstanding from the valving member for rocking the same, said body having a marginal rim about the seat for retaining the valving member in position on its seat, resilient means for urging the plate to its normal position closing both ports, and a push pin having a transverse cylindrical opening receiving the outer end of the stem for rocking the same, such outer end being partially spherical to have universal bearing on the wall of the opening.

12. A valve comprising a body having a flat seat with spaced ports, a flat valving member having spaced marginal portions engaging the seat to close the ports, said member being rockable on the seat to lift either marginal portion to open the selected port, a stem upstanding from the valving member for rocking the same, said body having a marginal rim about the seat for retaining the valving member in position on its seat, resilient means for urging the plate to its normal position closing both ports, and a housing enclosing the body and the valving member and having means for guiding the stem in the plane of the two ports.

13. A valve comprising a body having a flat seat with spaced ports, a flat plate rockable on one or the other of two opposite edge portions adjacent the two ports for lifting the other edge portion away from the seat, a port closing member of flexible material carried by the edge portions and serving to seat over and close the ports and adapted to be lifted upon the rocking of the plate to selectively open the ports, means on the plate for rocking the valving member consisting of the plate and the port closing member, resilient means for urging the valving member to its normal port closing position, and a casing for the body enclosing the rockable valving member and having means for guiding the rocking means in the plane of the two ports, said valving member and body forming a chamber with which said ports communicate when opened by said valving member, there being a third port normally communicating with the chamber.

14. A valve comprising a body having a flat seat with spaced ports, an actuator plate rockable on the seat, a valving ring carried by the margin of the plate and serving normally to seat over and close the ports but adapted to be lifted therefrom upon the rocking of the plate to selectively open the ports, a stem upstanding from the member for so rocking the same, said body having a marginal rim about the seat for retaining the valving ring in position thereon, resilient means for urging the plate to its normal position, a casing telescoping the rim and enclosing the valving ring and having means for guiding the stem in the plane of the two ports, a face plate detachably mounted on the casing and provided with arcuate slots, and a retaining ring for the face plate having depending centering parts projecting through the arcuate slots and interlocking with the casing.

15. A valve comprising a body having a flat seat with spaced ports, a flat plate rockable on one or the other of two opposite edge portions adjacent the two ports for lifting the other edge portion away from the seat, a port closing member of flexible material carried by the edge portions and serving to seat over and close the ports and adapted to be lifted upon the rocking of the plate to selectively open the ports, means on the plate for rocking the valving member consisting of the plate and the port closing member, resilient means for urging the valving member to its normal port closing position, a casing for the body enclosing the rockable valving member and having means for guiding the rocking means in the plane of the two ports, said valving member and body forming a chamber with which said ports communicate when opened by said valving member, said body having a third port in communication with the thus formed chamber, said body also being formed with a filter chamber in communication with the third port, and a filter member in the filter chamber.

ANTHONY C. SCINTA.

REFERENCES CITED

The following references are of record in the file of this patent:

UNITED STATES PATENTS

| Number | Name | Date |
| --- | --- | --- |
| 2,153,029 | Tarris | Apr. 4, 1939 |
| 2,274,917 | Carlson | Mar. 3, 1942 |
| 2,311,464 | Parker | Feb. 16, 1943 |
| 2,311,465 | Parker | Feb. 16, 1943 |
| 2,354,814 | Joesting | Aug. 1, 1944 |
| 2,374,895 | Ray | May 1, 1945 |